June 23, 1936.  A. B. MODINE  2,045,044
HEATING AND VENTILATING APPARATUS
Filed Feb. 17, 1934
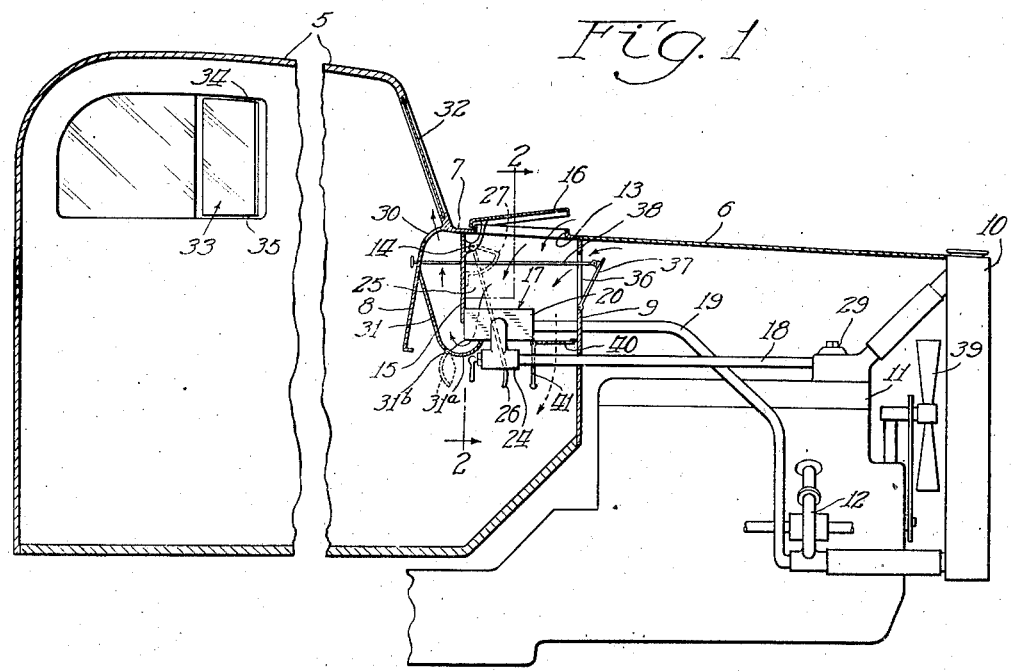
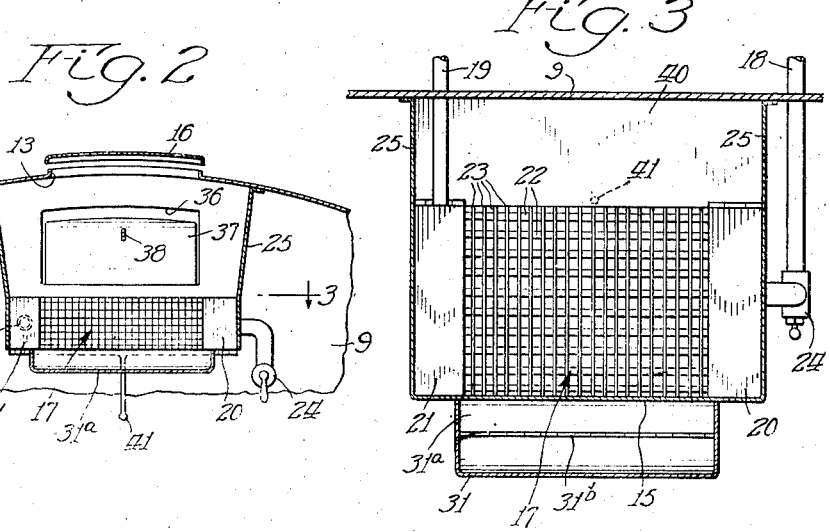
Witness:
V. Siljander
Inventor
Arthur B. Modine
By:
Hill & Hill
Attys Patented June 23, 1936

2,045,044

UNITED STATES PATENT OFFICE 2,045,044

HEATING AND VENTILATING APPARATUS

Arthur B. Modine, Racine, Wis., assignor to Modine Manufacturing Company, Racine, Wis., a corporation of Wisconsin Application February 17, 1934, Serial No. 711,707

5 Claims. (Cl. 237—12.3)

REISSUED

This invention relates to heating and ventilating apparatus and particularly to apparatus adapted for use in heating the interior of motor vehicles by the heat generated in the cooling medium employed for cooling the engine of the vehicle.

One object of the present invention is to produce circulation of heated air in the vehicle body by currents of air induced by the movement of the vehicle in its operation.

Another object of the invention is to provide a construction and arrangement whereby the heated air is circulated within the vehicle body by currents of fresh air introduced directly from outside the body.

Another object of the invention is to provide a construction and arrangement wherein air heated by the cooling medium employed for cooling the engine of the vehicle is circulated by currents of fresh air from outside the vehicle body and induced by movement of the vehicle in its operation.

Another object of the invention is to provide a construction and arrangement whereby the induced air currents for circulating the heated air may be conveniently and readily controlled by the operator of the vehicle.

Another object of the invention is to provide a structure wherein air currents may be passed through the heat exchange device and into the interior of the vehicle body when the vehicle is not in motion, and wherein a portion of the heated air from the heat exchange device is directed against the inner surface of the windshield of the vehicle.

Another object of the invention is to provide a structure wherein a portion of the air currents circulating through the apparatus may be by-passed around the heat exchange device when it is desired only to ventilate the interior of the vehicle body, as in warm weather.

A further object of the invention is to provide a heating apparatus for motor vehicles wherein the circulation through the heat exchange device of the cooling medium employed for cooling the engine of the vehicle may be readily controlled by the operator.

A still further object of the invention is to improve apparatus of the character described in sundry details hereinafter referred to and particularly pointed out in the appended claims.

One embodiment of the present invention is shown for illustrative purposes in the accompanying drawing, in which Fig. 1 is a fragmentary longitudinal sectional view of a portion of an automobile illustrating the application of my improved heating apparatus thereto.

Fig. 2 is a transverse sectional elevational view of a portion of the structure illustrating Fig. 1, and taken substantially as indicated in the line 2—2 thereof, and Fig. 3 is an enlarged plane sectional view taken substantially as indicated by the line 3—3 of Fig. 2.

The portion of the automobile or motor vehicle illustrated in Fig. 1 comprises a body portion, indicated by the numeral 5, a hood 6, cowl 7 positioned between the hood and body, an instrument board 8, dash-board 9, radiator 10 forming a part of the cooling system for the automobile, and an engine 11, the engine being provided with a suitably driven pump 12 for circulating the cooling fluid through the block of the engine and the radiator 10 in a manner well known in systems of the character described.

The cowl 7 of the illustrative arrangement is provided with a ventilator opening 13, and mounted on a shaft 14 supported in brackets suitably mounted on a wall member 15, is a closure member 16 operatively related to the opening 13 in a manner to close the opening or permit the passage of air therethrough as desired.

For heating the interior of the body of the vehicle with heat generated in the cooling medium employed for cooling the engine 11, a heat exchange device indicated as a whole by the numeral 17 is positioned between the instrument board 8 and the dash board 9 as shown in Fig. 1 and is operatively related to the cooling system of the engine by means of pipes 18 and 19.

The heat exchange device 17 may be of any suitable construction and, for illustrative purposes in the present instance, is shown in Fig. 3 of the drawing as comprising a plurality of spaced headers 20 and 21 connected together by means of a plurality of fluid conducting pipes or flues 22, having a plurality of heat radiating fins 23 extending transversely thereof and operatively related thereto, the header 20 being connected with the fluid chamber of the engine head by means of the pipe 18, and the header 21 to the intake side of the pump 12 by means of a pipe 19 for circulating the cooling fluid of the engine through the pipe 18, header 20, flues 22, header 21, pipe 19 and thence through the pump 12 into the cooling jacket of the engine, the pipe 18 being shown, in the present instance, as provided with a manually operated valve 24 positioned inside the body of the vehicle and within convenient reach of the operator for controlling the passage of fluid through the heat exchange device 17.

Mounted adjacent the end portions of the heat exchange device and extending upward therefrom to adjacent the underside of the cowl 7 are wall members 25 adapted to cooperate with the wall member 15 and dash-board 9 to provide an air conduit communicating at its upper end with the ventilator opening 13, and at its lower end with the open portion of the heat exchange device for conducting fresh air from outside the vehicle through the heat exchange device when the closure 16 is open.

For controlling the position of the closure 16 with respect to the ventilator opening 13 to vary the quantity of air passing therethrough, the shaft 14 is provided with an arm 26 adapted to engage a quadrant 27 having a notched or serrated edge and mounted on the wall member 15 as clearly shown in Fig. 1. It will be observed that by such an arrangement, the closure 16 may be adjusted and maintained in various positions of adjustment by positioning the arm 26 in one or another of the notches or serrations formed in the edge of the quadrant 27.

If desired, the cooling system of the automobile may include a thermostatically controlled valve shown, at 29 in Fig. 1, as built into the engine head and provided for trapping or preventing circulating of the cooling medium of the engine through the radiator 19 until the temperature of the cooling medium has reached the desired degree, but does not prevent circulation of the cooling medium through the heat exchange device, thereby permitting the temperature of the cooling medium to rise quickly and thus increase the efficiency of the heater.

As illustrated in Fig. 1, the instrument panel 8 is provided adjacent its upper edge portion with an aperture or plurality of apertures as indicated at 30, and positioned between the instrument panel 8 and the wall member 15 in spaced relation with respect to the heat exchange device 17 and extending under a portion thereof adjacent its rear side is a channel-shaped deflecting member 31 adapted to deflect a portion of the air currents passing through the heat exchange device 17 around the lower edge of the wall member 15 and upwardly through the apertures 30 to impinge upon the inner surface of the windshield 32 of the vehicle body. The channel-shaped deflecting member 31 may include a movable portion 31a hingedly connected at 31b adjacent the lower end of member 31 and adapted to be secured in the full line position beneath a portion of the heat exchange device 17 by any suitable means, as, for example, a spring clip (not shown), and when it is desired to omit the passing of heated air upwardly through the apertures 30 of the instrument panel 8, the portion 31a may be swung downwardly to the dotted line position shown in Fig. 1.

As illustrated also in Fig. 1, the vehicle is provided with an improved type of ventilating window construction as indicated at 33, in which a portion of the window is adapted to be swung outwardly about the vertically aligned pivots indicated at 34 and 35, in a manner to draw air from within the vehicle body outwardly, without admitting a draft of outside air to enter the interior of the body through the open portion of the window. Any equivalent type of window construction may be employed.

It would be observed from the foregoing description that the present invention provides a novel construction and arrangement wherein heat generated in a cooling medium employed for cooling the engine may be transmitted through the heat exchange device 17 and circulated in the interior of the vehicle by currents of fresh air from outside the vehicle, and that by reason of the ventilating window construction just described, it will be apparent that the fresh air entering the ventilator opening 13 is free from engine odors, and that in its passage through the heat exchange device 17, the fresh air is heated and may be circulated throughout the interior of the vehicle body, and when having become contaminated with foul air from within the body, it may be discharged through the ventilating window 33, thus providing fresh heated air for warming and ventilating the interior of the vehicle body.

It will be observed also that by reason of the instrument board construction above described including the apertures 30 and the arrangement of the channel-shaped deflecting member 31 provides for directing a portion of the heated air toward and into contact with the inner surface of the windshield 32 for warming the windshield and preventing an accumulation of condensate, frost or ice, either on the inner or the outer surface thereof.

For providing circulation of air through the heat exchange device 17 and the interior of the vehicle body when the vehicle is not in motion, the dash-board 9 may be provided, as shown in the present instance, with an inlet port 36 having a pivoted cover 37 associated therewith and adapted to be opened and closed by means, shown in the present instance, as a rod 38 extending rearwardly through the instrument board 8 and conveniently accessible to the operator of the vehicle for moving the cover 37 to an open or closed position as desired.

It will be observed from such an arrangement that when the vehicle is not in motion, and with the closure 16 either open or closed, the cover 37 may be moved to open position as shown in Fig. 1, and a current of air passed through the port 36 by the operation of the fan 39, commonly provided in a motor vehicle construction.

It will be observed from an examination of Figs. 1 and 3, that the forward side of the heat exchange device 17 is positioned a substantial distance away from the dash-board 9, thereby providing a passage having a pivoted shutter 40 associated therewith adapted to be closed as shown in Fig. 1, when it is desired to circulate the air currents through the heat exchange device 17, for heating the interior of the vehicle body, and which may be opened by means of a handle 41 when it is desired to by-pass the currents of air around the heat exchange device 17, when it is desired to introduce air from outside the vehicle merely for ventilating purposes as may be desired in warm weather, at which time the valve 24 may be actuated to prevent circulation of the cooling medium of the engine through the heat exchange device 17.

Under the conditions just described, it will be obvious that a substantial portion of the incoming air will be circulated through the passage between the heat exchange device 17 and the dash-board 9, and although a portion of the air may pass through the heat exchange device 17, practically no heat will be taken up from the device owing to the closing of the valve 24, thus providing an ample supply of fresh outside air for ventilating purposes.

Obviously, the present invention is not limited to the precise construction and arrangement shown and described, as the same may be variously modified. Moreover, all the features of the invention need not be used conjointly as the same may be used to advantage in variously different combinations and subcombinations.

What I claim as new and desire to secure by Letters Patent is:

1. In a heating and ventilating apparatus, the combination with a motor vehicle having an engine, a cooling system therefor employing a cooling fluid, an instrument panel having apertures formed therein adjacent its upper edge, the body of the vehicle having a ventilator opening formed therein adjacent said instrument board and an adjustable closure for said opening, of an air conduit communicating with said opening and the interior of the vehicle body for conducting air from said opening to the interior of the body, a heat exchange device positioned in said conduit and operatively related to the cooling system of the engine for passing the cooling fluid thereof through said device, and a deflecting member extending under a portion of said heat exchange device for directing a portion of the air passing therethrough upwardly and through the apertures formed in said instrument board.

2. In a ventilating apparatus, the combination of a vehicle body having a ventilator opening therein for admitting air to the interior of the body, said body having a windshield, an instrument panel having apertures formed therein directed toward said windshield, and a deflecting member positioned in the path of the air entering said opening for directing a portion of the air toward and through the apertures in said instrument panel.

3. In a ventilating apparatus, the combination of a vehicle body having a ventilator opening therein, a closure for said opening, a conduit for conducting air from said opening to the interior of said body, an instrument panel having apertures formed therein adjacent the upper portion thereof, and a deflecting member operatively related to said conduit and instrument panel for directing a portion of the air toward and through the apertures formed in said panel.

4. In a heating and ventilating apparatus, the combination of a motor vehicle body having an engine, a dash board having a port formed therein positioned between said engine and the interior of said body, a cover for said port, a conduit for conducting air from said port to the interior of the body, an instrument panel having apertures formed therein adjacent its upper portion, and a movable deflecting member operatively related to said conduit for directing a portion of the air passing therethrough toward and through the apertures formed in said panel.

5. In a heating and ventilating apparatus, the combination with a motor vehicle having an engine and a windshield, a cooling system therefor employing a cooling fluid, an instrument panel having apertures formed therein adjacent said windshield, the body of said vehicle having a ventilator opening formed therein, a closure for said opening, an air conduit communicating with said opening and with the interior of the vehicle body for conducting air from the opening to the interior of the body, a heat exchange device positioned in said conduit and operatively related to the cooling system of the engine for passing the cooling fluid thereof through said device, and a movable deflecting member adapted to be positioned with relation to said heat exchange device for directing a portion of the air passing therethrough toward and through the apertures formed in said instrument panel.

ARTHUR B. MODINE.